Figure 1:
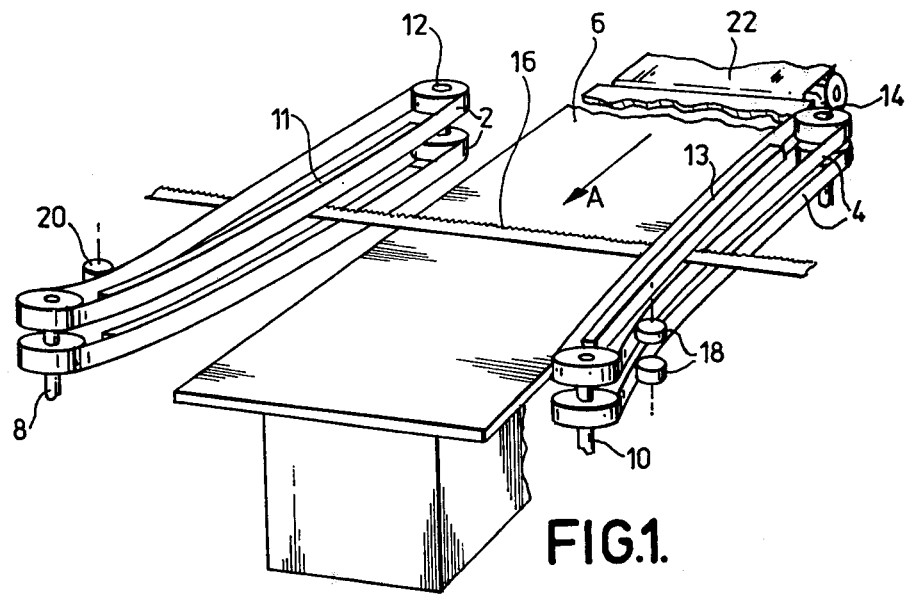

United States Patent [19]

Fenn et al.

[11] 4,211,131
[45] Jul. 8, 1980

[54] CUTTING OF CORRUGATED MATERIAL

[75] Inventors: Cyril P. Fenn; William H. Thelwell, both of St. Helens, England

[73] Assignee: Fibreglass Limited, St. Helens, England

[21] Appl. No.: 902,283

[22] Filed: May 3, 1978

[30] Foreign Application Priority Data

May 4, 1977 [GB] United Kingdom ............... 18677/77

[51] Int. Cl.² ...................... B23D 53/08; B23D 55/04
[52] U.S. Cl. ......................................... 83/56; 83/435; 83/435.2; 83/871; 83/925 R; 72/129; 264/152; 425/303
[58] Field of Search ................ 83/861, 870, 871, 872, 83/873, 874, 54, 56, 435, 435.2, 449, 732, 420, 422, 925 R; 72/129, 180; 264/152; 425/303

[56] References Cited

U.S. PATENT DOCUMENTS

| 1,344,096 | 6/1920 | Sprague | 83/871 |
| 1,584,796 | 5/1926 | Weal | 83/873 |
| 2,350,996 | 6/1944 | Atkinson et al. | 264/152 X |
| 2,669,269 | 2/1954 | Schmidt | 83/873 |
| 3,818,787 | 6/1974 | Deutsch | 83/880 |
| 3,832,922 | 9/1974 | Stout | 83/420 X |
| 3,888,150 | 6/1975 | Stroud | 83/422 X |

FOREIGN PATENT DOCUMENTS 2271006 12/1975 France ......................................... 83/54

Primary Examiner—J. M. Meister
Attorney, Agent, or Firm—Newton, Hopkins & Ormsby

[57] ABSTRACT

A method of cutting corrugated material into a plurality of channel shaped bodies in which the material is conveyed by means of guide members parallel to a path along which the material is conveyed. The path is perpendicular to the channels defined by the corrugations and the walls of the channels are severed while the corrugated material is held by the guide members.

16 Claims, 4 Drawing Figures

U.S. Patent  Jul. 8, 1980  4,211,131

CUTTING OF CORRUGATED MATERIAL

The present invention relates to cutting channel-shaped bodies. More particularly the invention relates to a method and apparatus suitable for cutting a corrugated section of glass fibres, hereinafter referred to as a batt.

A batt is normally manufactured by forming corrugations in a section cut from a mat of glass fibres and then curing the corrugated section by means of a hot air press. Two opposite edges of the batt are then trimmed transversely of the corrugations to produce corrugations of fixed length. The trimmed batt is then fed manually into a machine and is conveyed over roller or belt conveyors along a direction parallel to the line of the corrugations. The batt is thereby conveyed to a horizontal bandsaw which severs the batt into a plurality of separate channel-shaped bodies. Each channel-shaped body is then manually transferred to a further machine which trims a portion off the elongate parallel edges of each body so as to produce a channel-shaped body of required dimensions.

The method described above is extremely wasteful in material in that normally as much as $\frac{3}{8}$ inch of material may have to be trimmed off each elongate edge of each channel-shaped body to bring it to the required size. The $\frac{3}{8}$ inch is allowed for in the initial moulding of the batt and is required because of possible inaccuracies during the severing of the batt by the bandsaw. The inaccuracies arise from machine tolerances but more particularly we believe from deformation of the batt and inaccurate guidance of the batt as it is cut by the bandsaw.

The described method is also extremely wasteful in production time in that each channel-shaped body has to be individually passed through a final trimming machine.

the channel-shaped bodies produced by the above method are semi-cylindrical and can be used in conplementary pairs to insulate piping installations. The above method produces a deformed produce with frayed elongate edge surfaces, the deformation of the product results in poor matching of the complementary pairs with a consequent reduction in insulation efficiency.

The present invention strives to improve the edge-quality of the channel-shaped bodies, eliminate the need for the final trimming operation of the channel-shaped bodies with the consequent elimination of waste material and control more accurately their finished dimensions.

According to the present invention there is provided a method of cutting a corrugated material into a plurality of channel-shaped bodies, comprising conveying the corrugated material along a conveyor path by means of moving guide members extending substantially parallel to the conveyor path, and which hold the transverse edges of the corrugated material, the conveyor path extending substantially perpendicular to the plurality of channels defined by the corrugations in the corrugated material, and severing the walls of the channels whilst the corrugated material is held by the guide members.

The method is particularly suited for severing the channel walls of batts, in that a batt has a relatively high degree of rigidity across its section extending along the lines of the corrugations. This rigidity balances the compressive forces which are generated across the batt by the moving guide members and so reduces deformation of the batt during the severing operation.

A feature of the present invention is to provide an apparatus for cutting a batt into a plurality of channel-shaped bodies, comprising spaced guide members disposed on opposite sides and extending substantially parallel to a conveyor path for the batt, and a saw extending transversely between the guide members, the guide members having means for holding the transverse edges of the batt and for imparting movement to the batt to allow severing by the saw of the walls of the channels defined by the corrugations in the batt.

Preferably the guide members are each in the form of a pair of spaced endless belts, the end portions of the saw extending through the space between the belts. Advantageously the belts are guided in their movement along guide supports which extend substantially parallel to the conveyor path. Each pair of belts can extend around and between wheels on two shafts, one of which shafts is connected to a drive unit for rotating the shaft.

Conveniently means are provided for selectively adjusting the spacing between the opposed pairs of belts and each belt has means for adjusting its tension. One form of suitable tensioning means are rollers adjustable in a horizontal plane to press against the surface of the belts. Alternatively the tension of the belts can be adjusted by adjusting the position of the shafts around which the belts extend.

Advantageously a horizontal table extends beneath the saw to provide a support surface over which the lower surface of the corrugated material can slide. Preferably the table is level and smooth and thereby provides minimum frictional resistance to the batt during sliding. In order that the distance between the saw and table can be adjusted means are provided for allowing relative vertical movement between the saw and table. The table may, for example, be fixed and the saw and belt assembly movable or vice versa.

The apparatus according to the present invention has been described above in relation to its suitability for cutting batts into channel-shaped bodies. It will be appreciated that the apparatus is also suitable for the final trimming of single channel-shaped bodies. Single channel-shaped bodies can be moulded separately as half sections and are usually so produced when very large channel-shaped bodies are required, for example bodies with an internal diameter of 24 inches and walls 4 inches thick. Such large channel-shaped bodies are first trimmed by vertical saws so as to produce a body of desired length and are then conveyed according to the present invention with their channels extending substantially perpendicular to the conveyor path by means of the spaced guide members. The guide members convey the channel-shaped bodies to the saw which cuts through the walls of the bodies and thereby produces bodies of desired size. In this application of the present invention waste material is unavoidable but the edge quality and accuracy of cut of the channel-spaced bodies is improved in the same manner as those produced from batts.

Figure 2:
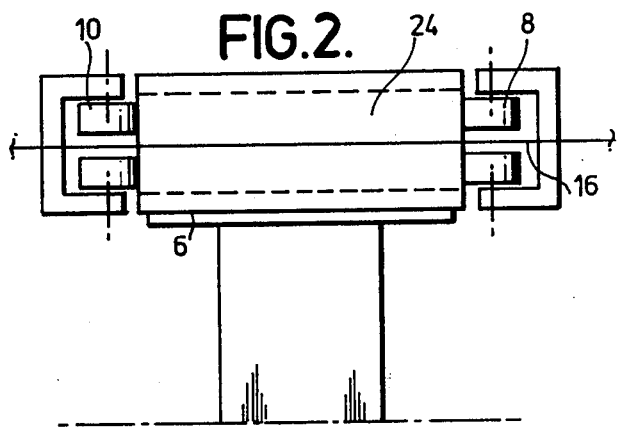
Figure 3:
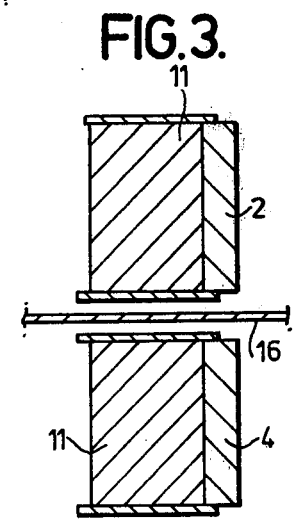
Figure 4:
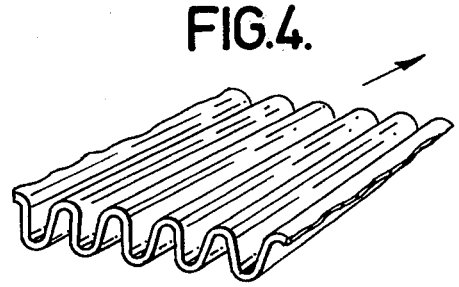

The invention will be described further, by way of example, with reference to the accompanying drawings in which:

FIG. 1 is a perspective view of an apparatus according to the present invention, FIG. 2 is an end view of the apparatus of FIG. 1 with a batt on the table between the belts, FIG. 3 is an enlarged section through the guide and belt assembly in the vicinity of the saw and FIG. 4 is a perspective view of a batt showing by arrow the direction of the line of corrugations.

Referring to FIGS. 1 to 3 two pairs of spaced endless non-slip belts 2,4 are mounted on opposite sides of and parallel to a conveyor path designated by arrow A. The belts 2,4 are mounted in vertical planes extending beyond the transverse edges of and mounted independently of a horizontal level and smooth table 6. Each pair of belts 2,4 extend around wheels fixedly attached to respective drive shafts 8,10 which are driven at the same speed by a common drive unit (not shown). The other ends of each pair of belts 2,4 extend around wheels fixedly attached to respective non-driven, rotatable shafts 12,14 respectively. The shafts 8,10,12,14 are mounted so that their location can be adjusted in a horizontal direction enabling the distance between the pairs of belts 2,4 to be adjusted. The belts 2,4 are guided over rigid guide supports 11,13 mounted in planes extending parallel to the intended conveyor path A.

A band saw blade 16 of 1 inch width extends in a horizontal plane transversely between the spaced belts 2,4 and is mounted in a plane substantially normal, and preferably exactly normal to the vertical planes defined by the belts 2,4. The band saw blade 16 has a clearance of approximately ⅛ inch between each of the guide supports 11,13. The table 6 lies in a parallel plane to the band saw blade 16 and is vertically adjustable to allow adjustment of the spacing between the band saw blade 16 and table 6.

Pairs of tensioning rollers 18,20 are adjustably mounted to apply a tension to the belts 2,4.

Vertical blades (not shown) for trimming the transverse edges of the batt are located upstream of the table 6.

In operation a batt 24 (see FIG. 2) of approximately 38 inches length and approximately one yard wide is delivered to the table 6 from an upstream conveyor 22. The batt 24 has already been trimmed by the vertical blades and is arranged with its corrugations normal to the conveyor path A. The pairs of belts 2,4 are driven by shafts 8,10 at a linear speed of approximately 6 meters/min 820 ft/min) which is slightly faster than the delivery speed of the conveyor 22. The batt is slid over the table 6 until its front transverse edge portions are engaged by the pairs of belts 2,4 which guide the batt accurately to the horizontal band saw blade 16 which serves the batt along a horizontal plane to form a plurality of channel-shaped bodies. Each channel-shaped body still has its transverse edges engaged by the belts 2,4 which transfer the bodies to the end of the table 6 whereupon they are allowed to fall down onto another lower conveyor (not shown).

By allowing the channel-shaped bodies to fall down onto the lower conveyor most of the glass fibre dust which tends to adhere to the channel-shaped bodies during severing is freed due to the impact of the batt with the lower conveyor. A vacuum system (not shown) is located in the vicinity of the lower conveyor to take up the loose dust lost from the channel-shaped bodies during impact. It is to be noted that since the batt is cut with the line of the corrugations extending normal to the conveyor path less dust collects in the channels defined by the lower half of the corrugations than in the previous method which involved cutting the batt with its corrugations parallel to the conveyor path. Thus the environmental conditions for the machine operators is improved.

It is possible using the above apparatus to control the distance between the table 6 and band saw blade 16 to one thousandth of an inch, thereby removing the necessity of allowing as much as ¾ inch tolerance. Since the thickness of the band saw blade 16 is known the channel-shaped bodies can be cut to within one thousandth of an inch of their required size. In this manner a final trimming operation with consequent waste of material is avoided. Also as will be appreciated the batts are guided accurately and held under a fixed tension up to the bandsaw blade 16. Such a transport system for the batts substantially prevents any horizontal or vertical movement of the batt relative to the band saw blade 16 and consequently provides an accurate, smooth cut to be executed by the bandsaw blade 16.

Although the above embodiment describes the use of the table 6 it is envisaged that it may be possible with suitable adjustment of tht tensioning of belts 2,4 to avoid the need for the table 6. Further if a table is used it does not need to extend to the downstream end of the belts 2,4 but can end just below or slightly downwstream of the bandsaw blade 16.

To sum up therefore, the invention provides a method of cutting material of curved cross-section in a direction parallel to the axis of the curve to form a channel shaped body of predetermined size, comprising conveying the curved material along a path of movement by means of moving guide members which extend substantially parallel to the path of movement and which hold the transverse edges of the material with the path of movement extending substantially perpendicular to the axis of the curve of the material and cutting the material by means of a saw moving across the path of movement to form a channel shaped member with improved edge quality.

If a large, heavy channel-shaped body has to be cut it may be advantageous to ensure that the whole of the body is supported during and after severing of the body until the severed body has been completely removed from the guide members. Such support prevents sagging of the body caused by its weight, which sagging could cause damage to the transverse sides of the body or could force the guide belts off their wheels. It may therefore, be necessary, depending on the size of the body, to provide extra support downstream of the guide members. The extra support may take the form of arms in line with the existing guide members which will support the body from beneath after it has left the guide members, or alternatively the extra support may be provided by an extension to the table which will support the body from beneath.

What we claim is:

1. A method of cutting a corrugated material into a plurality of channel-shaped bodies, comprising conveying the corrugated material along a conveyor path by means of moving guide members extending substantially parallel to the conveyor path, and which hold the transverse edges of the corrugated material, the conveyor path extending substantially perpendicular to the plurality of channels defined by the corrugations in the corrugated material, and severing the walls of the channels whilst the corrugated material is held by the guide members.

2. A method as claimed in claim 1 in which the corrugated material comprises glass fibres.

3. An apparatus for cutting a corrugated batt into a plurality of channel-shaped bodies, comprising a pair of spaced endless belts disposed on opposite sides and extending substantially parallel to a conveyor path for the batt, and a saw extending transversely between the belts, the end portions of the saw extending through the space between the belts, the belts having means for holding the transverse edges of the batt and for imparting movement to the batt to allow severing by the saw of the walls of the channels defined by the corrugations in the batt.

4. An apparatus as claimed in claim 3 in which the belts are guided in their movement along guide supports which extend substantially parallel to the conveyor path.

5. An apparatus as claimed in claim 3 or claim 4 in which each pair of belts extend around and between wheels mounted on two shafts, at least one of the shafts being connected to a drive unit.

6. An apparatus as claimed in claim 3 in which means are provided for selectively adjusting the spacing between the opposed pairs of belts.

7. An apparatus as claimed in claim 3 in which means are provided for adjusting the tension of each belt.

8. An apparatus as claimed in claim 7 in which the tensioning means are rollers adjustable in a horizontal plane for pressing against a surface of each belt.

9. An apparatus as claimed in claim 5 in which the shafts are adjustable for movement towards or away from each other in order to adjust the tension of the belts and in which means are provided for adjusting the tension of each belt.

10. An apparatus as claimed in claim 3 or claim 4 in which a horizontal table extends beneath the saw to provide a support surface over which the lower surface of the corrugated material can slide.

11. An apparatus as claimed in claim 19 in which means are provided for adjusting the distance between the saw and table.

12. An apparatus as claimed in claim 11 in which the table is fixed and the saw is mounted for vertical movement relative to the table.

13. An apparatus as claimed in claim 12 in which the saw is fixed and the table is mounted for vertical movement relative to the table.

14. An apparatus as claimed in claim 10 in which an end of the table is located directly below or slightly downstream of the saw.

15. A method of cutting a channel-shaped body, comprising conveying the channel-shaped body along a conveyor path by means of moving guide members extending substantially parallel to the conveyor path, and which hold the transverse edges of the channel-shaped body, the conveyor path extending substantially perpendicular to the channel, and severing the wall of the channel whilst the channel-shaped body is held by the guide members.

16. A method of producing a channel-shaped body, comprising the steps of conveying a corrugated material along a conveyor path by means of moving guide members extending substantially parallel to the conveyor path and which hold the transverse edges of the channel-shaped body, the conveyor path extending substantially perpendicular to the channel, and severing the walls of the corrugations whilst the corrugated material is held by the guide members.

* * * * *